United States Patent
Brewer

(10) Patent No.: US 6,912,890 B2
(45) Date of Patent: Jul. 5, 2005

(54) PIPELINE LEAK-TESTING DEVICE

(76) Inventor: Michael C. Brewer, 507 W. Behrend Dr., Phoenix, AZ (US) 85027

(*) Notice: Subject to any disclaimer, the term of this patent is extended or adjusted under 35 U.S.C. 154(b) by 0 days.

(21) Appl. No.: 10/670,048

(22) Filed: Sep. 23, 2003

(65) Prior Publication Data

US 2004/0055364 A1 Mar. 25, 2004

Related U.S. Application Data

(63) Continuation-in-part of application No. 10/208,982, filed on Jul. 31, 2002, now abandoned.

(51) Int. Cl.[7] .............................................. G01M 3/04
(52) U.S. Cl. ................................................ 73/40
(58) Field of Search ............................... 73/40, 40.5 R, 73/49.1, 49.5, 49.8

(56) References Cited

U.S. PATENT DOCUMENTS

| | | |
|---|---|---|
| 1,720,819 A | 7/1929 | Cohen |
| 1,873,274 A | 8/1932 | Boosey |
| 3,941,156 A | 3/1976 | Metzger ..................... 138/90 |
| 4,168,621 A | 9/1979 | Kreitenberg ................ 73/40.5 |
| 4,281,422 A | 8/1981 | Simonelli ...................... 4/496 |
| 4,429,568 A | 2/1984 | Sullivan ...................... 73/49.8 |
| 4,542,642 A | 9/1985 | Tagliarino .................. 73/40.5 |
| 4,848,155 A | 7/1989 | Huber ........................ 73/49.8 |
| 5,076,095 A | 12/1991 | Erhardt ...................... 73/49.8 |
| 5,334,159 A | 8/1994 | Turkel ........................ 604/158 |
| 5,351,524 A | 10/1994 | Lanham ..................... 73/40.5 |
| 2002/0178794 A1 * | 12/2002 | Liao ........................... 73/49.8 |
| 2003/0037597 A1 * | 2/2003 | Tarara ..................... 73/40.5 R |

* cited by examiner

*Primary Examiner*—Charles Garber
(74) *Attorney, Agent, or Firm*—Cahill, von Hellens and Glazer, P.L.C.

(57) ABSTRACT

A device for leak-testing a pipeline system, of the type having a test tee fitting in a standpipe, includes a generally circular base plate for engaging an opening of the test tee, a wrench collar for tightening the base plate in the test tee, and a threaded bushing for filling the standpipe with water. A fluid channel passes through the bushing, wrench collar, and base plate, and a one-way valve is disposed within the fluid channel. A water hose is coupled to the bushing for passing water through the one-way valve into the interconnected pipeline system. After leak testing is completed, a sealing cap is secured over the bushing, and the device is left permanently in place after the test is completed.

13 Claims, 4 Drawing Sheets

PIPELINE LEAK-TESTING DEVICE

CROSS-REFERENCE TO RELATED APPLICATIONS

This patent application is a continuation-in-part patent application based upon U.S. patent application Ser. No. 10/208,982, filed Jul. 31, 2002, now abandoned and the benefit of such earlier filing date is hereby claimed by Applicant under 35 U.S.C. §120.

FIELD OF INVENTION

This invention relates to the testing of pipeline systems for leaks, and more particularly, to a permanent leak-testing device that permits the flow of fluid into a pipeline system through the device, and automatically seals itself via a one-way valve to prevent any leakage out of the pipeline system.

BACKGROUND

In general, the integrity of fluid-based, interconnected pipeline systems must be tested for leaks. This type of testing is applicable to oil pipeline systems, commercial wastewater systems, and residential plumbing systems, among others. During the construction of a building, for example, a plurality of drainage pipes are interconnected so that sewage or waste water may flow from multiple sources down a single drainage system. The pipeline system is inspected for leaks and must pass government inspection before occupancy is permitted.

Pipes for tubs, showers, sinks, and toilets, are interconnected and make a final connection to a stand-pipe or vent stack that extends several feet above ground level. The standpipe is coupled to the pipeline system to prevent the formation of a vacuum generated by fluid in the pipes. A test tee is typically installed at the junction between the stand-pipe and the remainder of the pipeline system to create a site for testing the integrity of the system. A conventional test tee includes a T or Y fitting in an elongate tubular member, which is permanently installed in the stand-pipe or the stack of sewage sections. The test tee includes an accessible opening, which is conventionally used to isolate a portion of a building's plumbing system with an air-filled balloon or other stopper device or to attach a device for filling the stand-pipe with water. Multiple test tees can be installed throughout large or multi-level pipeline projects to test specific areas.

To test the pipeline system, the stand-pipe is filled with water through the test tee and the pressurized pipeline system is inspected to determine if any leaks exist. Once the inspection of the system is completed, the water is released from the stand-pipe through the test tee and usually gushes onto the ground or floor.

Various prior art devices have been designed which are removably attachable to the test tee to cap its opening so that the pipeline system stays pressurized until inspected. One such device is a bushing and hose bib arrangement ("bushing/bib") made of off-the-shelf, standardized parts in which a plastic bushing is connected to a brass hose bib (spigot). The bushing/bib is screwed into the opening of the test tee. A plumber fills the pipeline system with water from a garden hose and seals the stand-pipe temporarily by closing the spigot. After the test is complete, the bushing/bib must be removed and replaced with a permanent cap.

One problem with the bushing/bib and other prior art devices is the cost of using these devices. Having a brass component, the bushing/bib is relatively expensive, even though it is reusable. However, the bushing/bib devices are often stolen—after the inspection—before the plumber can return to replace the bushing/bib with an inexpensive, permanent threaded plastic cap to cover the test aperture.

Another problem with the prior art devices is the potential water damage that can occur when the devices are removed after testing. The prior art devices are not designed to be permanent fixtures. Such a device cannot become a permanent fixture of the system and must be removed. When the prior art device is removed—either by a plumber or by a thief—a considerable volume of water flows outward from the opening of the test tee, which sometimes causes flooding and damage to the floor of the building and surrounding areas.

On the other hand, since such prior art testing devices are not intended to be permanent fixtures, significant problems can also arise if they are inadvertently left in the test fixture, and construction is completed. For example, U.S. Pat. No. 5,076,095 to Erhardt discloses a device having a paddle-shaped sealing member coaxially coupled to a freely rotatable threaded cap member which removably engages the tee fitting in a plumbing system vent stack. The paddle selectively extends across and seals the pipeline. The Erhardt device includes a one-way check valve to introduce pressurized fluid into the plumbing system above the aforementioned paddle inside the tee fitting. The paddle-shaped sealing member of the Erhardt device extends across, and either entirely blocks or partially restricts, the flow path in the tee. Many city codes prohibit any such blockage or restriction in the plumbing line; thus, if one forgets to remove the Erhardt device before covering over the plumbing line with drywall, the resulting structure is in violation of the city code. Additionally, if the Erhardt device were inadvertently left within the test tee, the paddle-shaped sealing member could later rotate to its closed position (i.e., upon a sudden rush of water) and seal off the pipe, leading to either undesired vacuums within the plumbing system, or possibly flooding. Furthermore, were the aforementioned Erhardt device inadvertently left in the test tee, and then covered over by drywall, water could eventually leak out from the test tee behind walls of the structure, causing the formation of mold.

Therefore, it is an object of this invention to provide a leak-testing device that significantly contributes to the ease and low cost involved in the inspection of a pipeline system for leaks. It is a further object of the invention that the leak-testing device may serve as a permanent attachment to the test tee so that removal is not required, thereby avoiding the expenses of having a plumber return to replace it or of having it stolen. It is a further object of this invention to have a leak-testing device made of inexpensive materials.

It is a further object of the invention that the leak-testing device may serve as a permanent attachment to the test tee so that removal is not required, thereby avoiding flooding of the foundation of the building or the area beneath the fluid-based pipeline system.

Another object of the present invention is to provide a leak-testing device that may be attached to the test tee of a pipeline system in such a way that fluid may be channeled through the testing device into the test tee.

It is a further object of the invention that the leak-testing device is leakproof so that no fluid escapes out of the testing device.

Further objects and advantages of the present invention will become apparent from the study of the following portions of this specification, the claims and the attached drawings.

SUMMARY OF THE INVENTION

The present invention is a device for leak testing a pipeline system which can be left in place after the test is completed. The pipeline system includes a standpipe having a tee fitting; the tee fitting has first and second opposing openings axially aligned with each other, as well as a third opening having internal threads. A generally circular base plate, or "threaded collar", has a threaded outer periphery for threadedly engaging the internal threads of the third opening of the tee fitting. The generally circular base plate has a fluid passage, or channel, extending centrally therethrough. A wrench collar is attached to the generally circular base plate and is preferably integral therewith; the wrench collar is adapted to be engaged by a wrench for tightening the generally circular base plate within the third opening of the tee fitting.

The leak testing device also includes a threaded bushing having a fluid passage, or channel, extending centrally therethrough. If desired, the threaded bushing may be connected to the generally circular base plate via the wrench collar, and in that instance, the wrench collar also includes a fluid passage, or channel, aligned with those of the base plate and threaded bushing. Preferably, the threaded bushing, wrench collar, and generally circular base plate are all integral with each other. The fluid passage of the threaded bushing is axially aligned with, and in fluid communication with, the fluid passage of the generally circular base plate to form a fluid channel therewith. The threaded bushing is adapted to engage an end of a water supply hose, having mating threads, to fill the standpipe with water through the aforementioned fluid channel. The threaded bushing may be internally-threaded to receive the male end of a water hose; alternatively, the threaded bushing may be externally-threaded to receive the female end of a water supply hose. A one-way valve is disposed within the aforementioned fluid channel for admitting water through the fluid channel into the standpipe, while preventing water from escaping through the fluid channel out of the standpipe. The leak-testing device is attachable to the third opening of the tee fitting of the standpipe without extending into, and without obstructing fluid flow within, the tubular section of the tee fitting.

Preferably, the leak testing device includes a cap to cover and seal the threaded bushing after leak-testing is completed. The sealing cap preferably has threads which mate with the threads of the threaded bushing. Ideally, the threaded bushing and sealing cap are made from plastic material ordinarily used to form PVC or ABS plastic plumbing pipe, and solvent bonding cement is applied to the mating threads before the cap is applied to form a leak-proof seal.

The one-way valve preferably includes a valve seat having at least one aperture therein, and a deformable valve disposed proximate the valve seat. In the preferred embodiment, the valve is an umbrella valve. The valve seat and deformable valve element are located within the generally circular base plate, within the wrench collar, and/or within the threaded bushing; thus, the valve is essentially internal to the leak testing device, and does not extend into, or obstruct flow within, the tubular section of the tee fitting. The valve seat may be positioned anywhere within the central fluid channel of the leak testing device; if desired, the valve seat may be disposed between the base plate and the wrench collar, or between the wrench collar and the threaded bushing.

In the preferred embodiment, a bushing—designed to receive a mating cap—is attached to a wrench collar and a threaded collar, all of which share a common axis. A pressure-activated one-way valve rests against a valve seat disposed along the common axis. The one-way valve does not extend into the tubular section of the tee fitting, and does not block the flow path in the tubular section of the tee fitting; rather, the one-way valve is preferably disposed within the leak testing device itself, at a point located somewhere between the threaded collar and the threaded bushing of the leak testing device.

Furthermore, the leak testing device does not include any components which protrude inside the tubular section of the tee fitting. Thus, the flow path inside the tubular section of the tee fitting remains unobstructed by the leak testing device, even though the leak testing device is left permanently within the tee fitting. Fluid passes from the hose through the one-way valve into the interconnected pipeline system. When the operator shuts off the fluid flow, the pressure from the fluid that has been pumped into the pipeline system causes the one-way valve in the device to seat itself across the valve seat, thereby preventing fluid from leaking out the leak-testing device. After the operator completes the testing for leaks in the pipeline system, the hose is removed and a cap may be attached to the bushing. The leak-testing device does not need to be removed—it becomes a permanent fixture.

Another aspect of the present invention relates to a new and improved method of leak testing such a pipeline system. A leak testing device is provided for being engaged with the third opening of the tee fitting. Such leak testing device may include a generally circular base plate, or "threaded collar", having a threaded outer periphery for mating with the internal threads of the third opening of the tee fitting; a fluid passage, or channel, extends centrally through the generally circular base plate. This leak testing device also preferably includes a wrench collar provided on the generally circular base plate, whereby a wrench is engaged with the wrench collar for tightening the generally circular base plate within the third opening of the tee fitting. A threaded bushing is provided, the threaded bushing having a fluid passage extending centrally therethrough; the fluid passage of the threaded bushing is axially aligned with, and in fluid communication with, the fluid passage of the generally circular base plate to collectively form a fluid channel. A one-way valve is formed within the fluid channel for admitting water through the fluid channel into the standpipe, while preventing water from escaping through the fluid channel out of the standpipe.

The end of a water hose is attached to the threaded bushing, and the pipeline system is substantially filled with water; the water hose may then be detached. The pipeline system is then checked for leaks, after which the aforementioned leak testing device (e.g., the generally circular base plate, wrench collar, threaded bushing, and one-way valve components) are permanently left in place within the third opening of the tee fitting. Preferably, a sealing cap is engaged over the threaded bushing after leak testing is completed to prevent any later water leaks. Ideally, the threaded bushing and sealing cap are made of plastic, and plastic cement (e.g., a solvent bonding cement, such as PVC cement, or other sealing material) is applied to the threaded bushing, to the sealing cap, or to both such components, before engaging the sealing cap over the threaded bushing to lock the cap in place. This formation of this water-tight seal between the cap and the threaded bushing, after completion of leak testing, prevents subsequent water leakage, which might otherwise result in mold growth behind a wall erected after testing is completed.

DETAILED DESCRIPTION OF THE PREFERRED EMBODIMENTS

Figure 1:
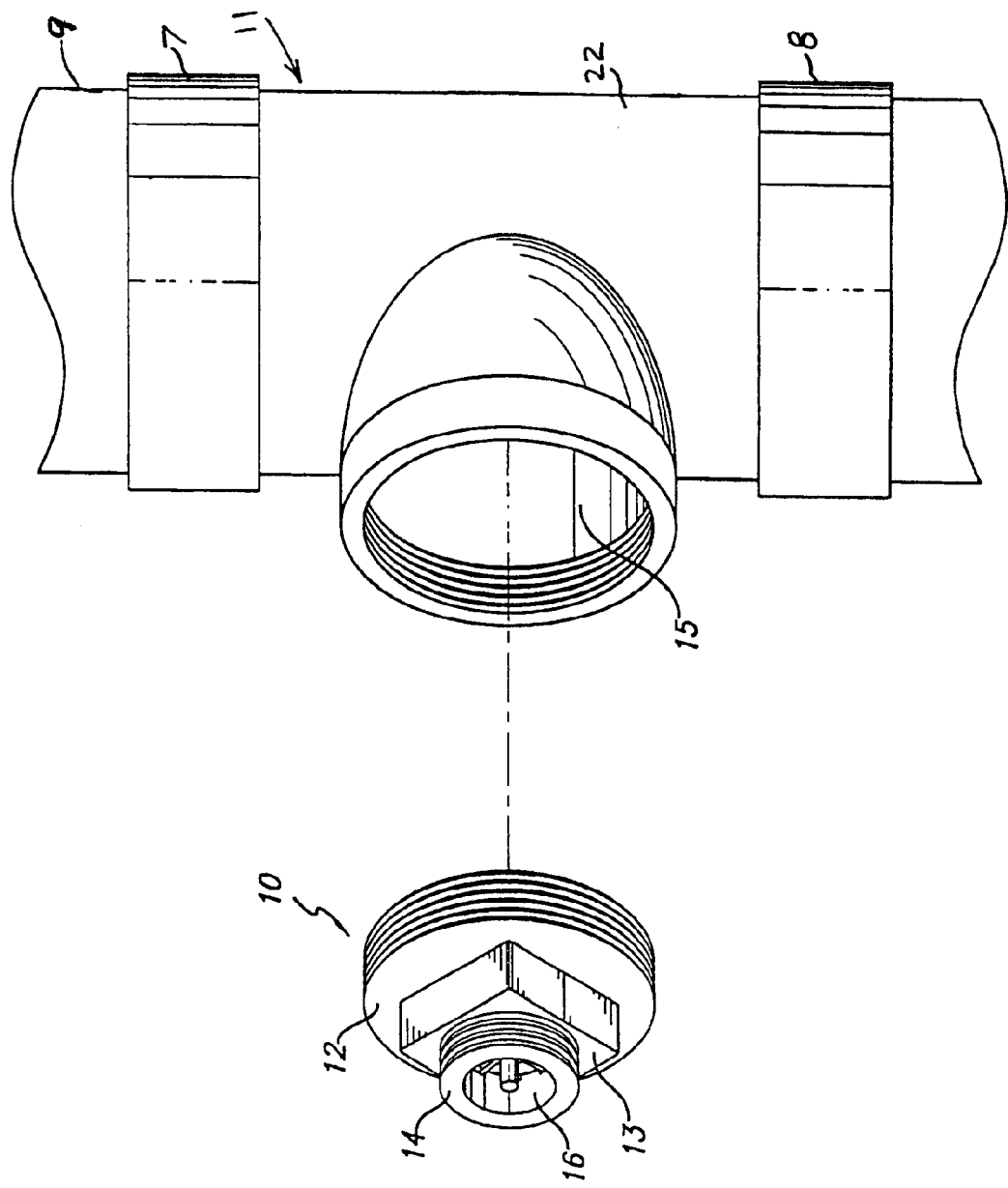
FIG. 1 is a perspective view of the leak-testing device according to a preferred embodiment of the invention, along with a typical tee fitting into which the leak-testing device may be attached.

A leak-testing device in accordance with a preferred embodiment of the present invention, designated generally by reference numeral 10, is illustrated with reference to FIGS. 1–5. In FIG. 1, leak-testing device 10 is shown along with a generic test tee fitting 11. Test tee fitting 11 is shown installed as part of a standpipe 9. Tee fitting 11 includes an elongated tubular section 22 extending between first and second opposing openings 7 and 8 that are axially aligned with each other, and which are co-axial with the normal flow path through the standpipe 9. Tee fitting 11 includes a third opening 15 communicating with tubular section 22 of tee fitting 11. Typically, third opening 15 has internal threads formed thereon. Leak testing device 10 is installed into third opening 15 of tee fitting 11.

As shown in FIG. 1, leak-testing device 10 includes a generally circular base plate 12, sometimes referred to herein as a "threaded collar". Base plate 12 has a threaded outer periphery for threadedly engaging the internal threads of third opening 15 of tee fitting 11. As shown best in FIG. 3, base plate 12 is essentially hollow and has a fluid passage extending centrally therethrough. Wrench collar 13 is attached to the upper surface of base plate 12, and is preferably formed to be integral therewith. The purpose of wrench collar 13 is to permit a wrench or other tool to tighten base plate (threaded collar) 12 within third opening 15 of test tee 11. Wrench collar 13 is preferably square in shape, but it could also be hexagonal or some other non-circular shape. As shown best in FIG. 3, the interior of wrench collar 13 is also hollow and provides a fluid passage coaxial with, and continuous with, the fluid passage of base plate 12. Note that while wrench collar 13 is illustrated as extending across the central region of the upper surface of base plate 12, wrench collar 13 may also be devised with tabs that protrude from base plate 12 for being gripped by a wrench or other tool.

A bushing 14 is attached to, and extends from, the upper surface of wrench collar 13; preferably, bushing 14 is formed to be integral with wrench collar 13 and base plate 12. In the embodiment of the invention depicted in FIGS. 1–5, bushing 14 is an externally-threaded bushing adapted to engage a female end 31 of a water supply hose (see FIG. 3) to fill standpipe 9 with water. Alternatively, as shown in FIG. 6, bushing 14 may instead be internally threaded to receive the male threaded end 35 of a water supply hose 36. Bushing 14 has a fluid passage 16 extending centrally therethrough; fluid passage 16 is axially aligned with, and in fluid communication with, the corresponding fluid passages of wrench collar 13 and base plate 12. Thus, bushing 14, wrench collar 13, and threaded collar 12 are interconnected along a common axis to collectively form a fluid channel.

Figure 3:
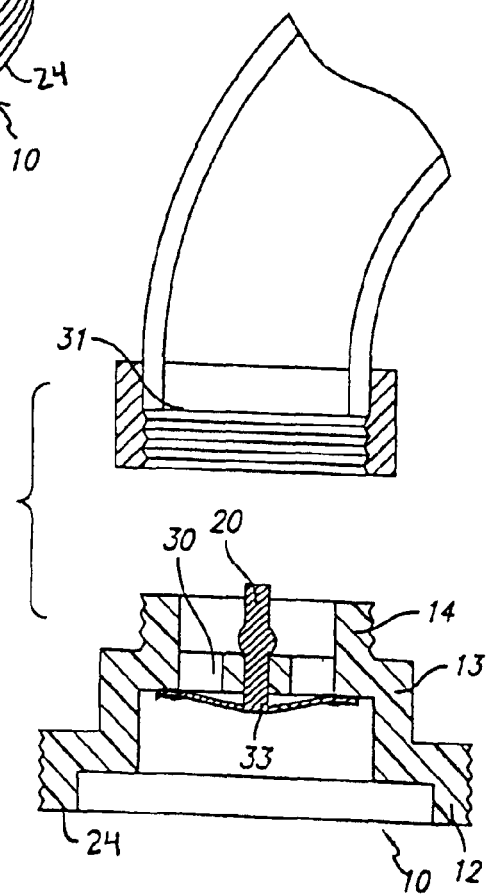
FIG. 3 is a cross-sectional view of the leak-testing device of FIGS. 1 and 2 taken along line 3—3 of FIG. 2, and also showing a water supply hose with a female, internally-threaded coupling end, which may be attached to the leak-testing device.

Leak testing device 10 includes a one-way valve disposed within the aforementioned fluid channel for admitting water into the standpipe 9 for testing purposes, while preventing water from escaping through such fluid channel out of standpipe 9. To this end, a valve seat 30 (having at least one aperture formed therein) is disposed across the fluid channel (see FIGS. 3 and 4), and a deformable valve member 20, having a valve head 33 (see FIGS. 3 and 5), is disposed proximate valve seat 30 for selectively seating against valve seat 30. In the preferred embodiment, valve seat 30 is formed between bushing 14 and wrench collar 13, at the point where bushing 14 merges with wrench collar 13, as shown in FIG. 3. However, valve seat 30 could instead be located between wrench collar 13 and threaded collar 12. In general, valve seat 30 could be located anywhere along the central fluid channel collectively formed by base plate 12, wrench collar 13 and bushing 14. In any case, valve member 20 does not extend into tubular section 22 of tee fitting 11, and does not block the standpipe flow path through tubular section 22 of tee fitting 11. Furthermore, leak testing device 10 does not include any components which protrude into the tubular section 22 of tee fitting 11, as might block the flow path therethrough. While it is not necessary to position valve member 20, or valve seat 30, below the bottom 24 of base plate 12, it should be noted that there is typically some open space between bottom 24 of base plate 12 and the flow path of tubular section 22 of tee fitting 11 after leak test device 10 is installed within opening 15 of tee fitting 11. Accordingly, valve seat 30 and/or valve member 20 could be disposed proximate to, but slightly below, bottom 24 of base plate 12, if desired, without causing such components to extend within tubular section 22 of tee fitting 11, and hence, without obstructing the flow path in tubular section 22.

Figure 5:
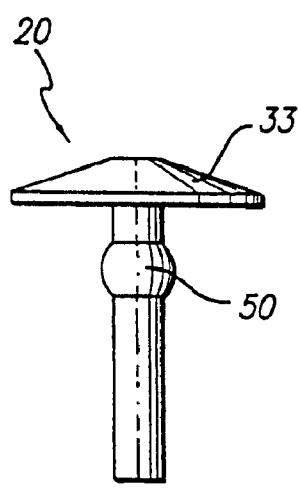
FIG. 5 is a side view of the one-way umbrella valve that seats against the valve seat shown in FIG. 4.
Figure 6:
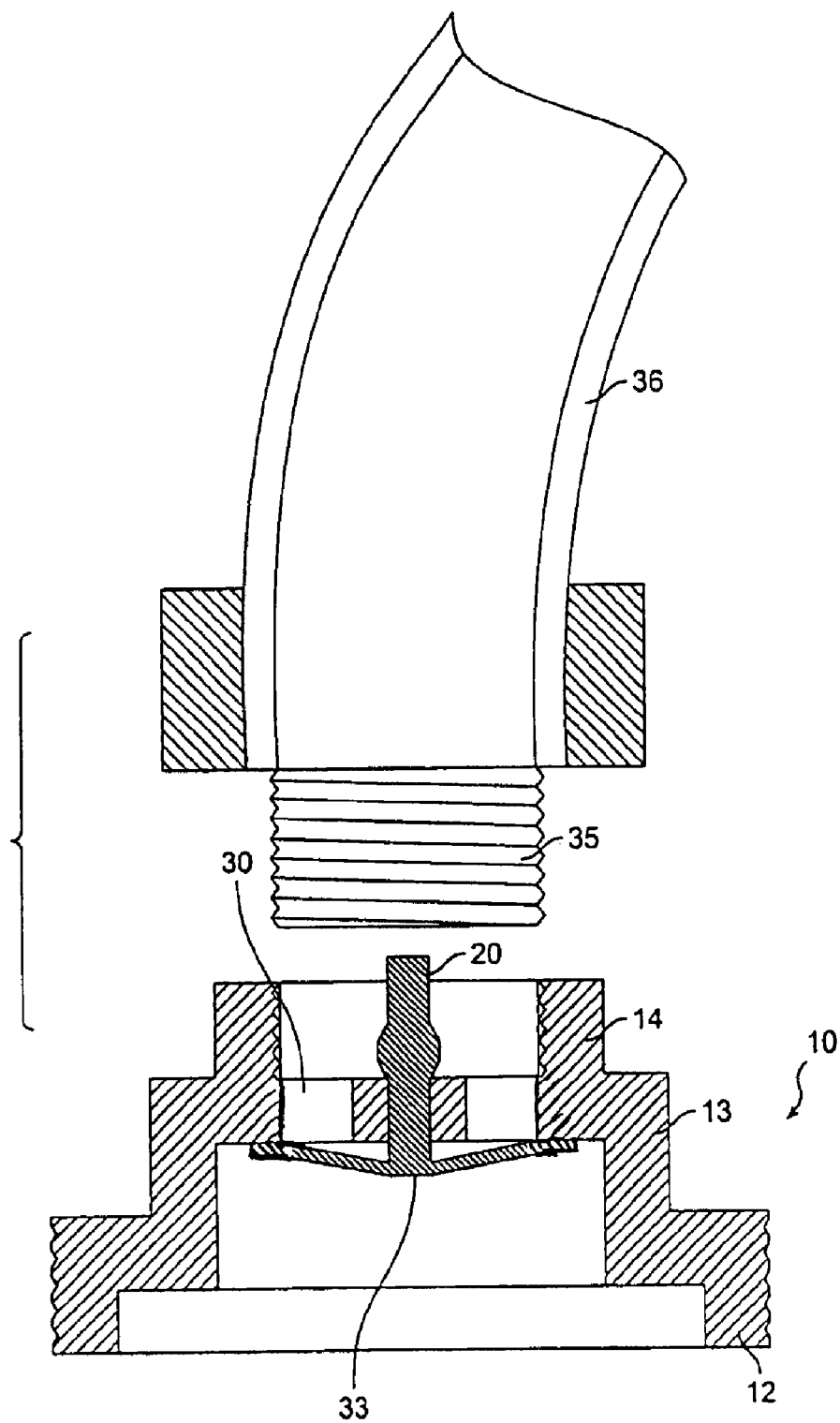
FIG. 6 is a view similar to that of FIG. 3, but wherein the water supply hose has an externally-threaded male end to mate with a threaded bushing having internal threads, in accordance with an alternate embodiment of the invention.

As illustrated in FIGS. 3 and 5, valve member 20 is preferably an umbrella valve. The manner in which this one-way valve functions and operates in use is described in more detail below. It should be apparent that other one-way valves—whether bought off the shelf or custom designed—may also be used.

The leak-testing device described herein is intended primarily for testing the plumbing system of a building for water leaks, although the device could be used on other types of pipeline systems having other types of fluids. In the embodiment shown in FIGS. 1–3, bushing 14 is externally threaded to accommodate the female end 31 of a garden hose, or a common washing machine style water supply hose. As shown in FIG. 6, bushing 14 may instead be internally threaded to accommodate an externally threaded male end 35 of a water hose 36, as shown in FIG. 6. However, bushing 14 may also consist of any alternative fashion for coupling with a fluid source, such as a snap mechanism with a fluid-tight seal.

When water under pressure is introduced into the central fluid channel of leak test device 10 through bushing 14, one-way valve 20 is forced open by the pressure of the water as it gushes through valve seat 30. The water pushes valve head 33 of one-way valve 20 toward the bottom 24 of threaded collar 12. When the flow of water stops, the pressure from the water that has entered the pipeline system automatically closes one-way valve 20 by forcing valve head 33 against valve seat 30, thereby sealing leak test device 10 so that the pipeline system may be tested for leaks.

Figure 2:
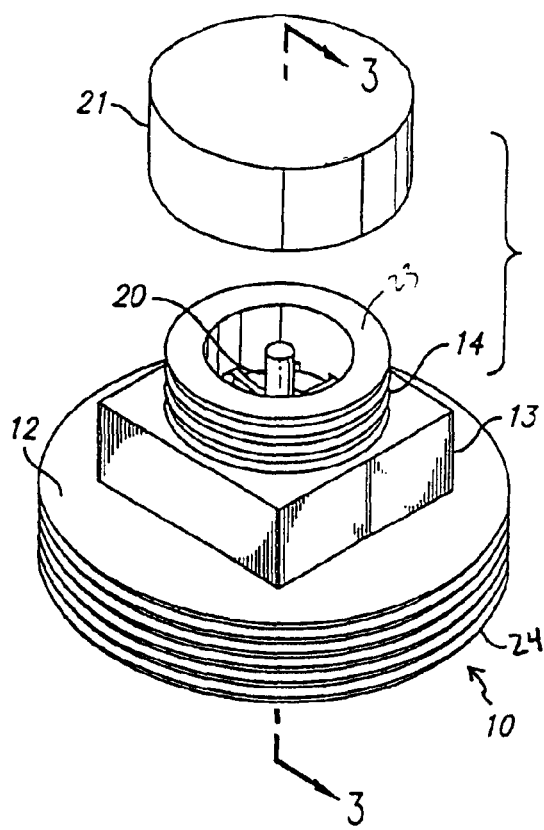
FIG. 2 is a perspective view of the leak-testing device shown in FIG. 1, as well as a; mating sealing cap.

In the preferred embodiment, a sealing cap 21 screws onto threaded bushing 14 after the testing of the pipeline system is completed, as shown in FIG. 2. However, cap 21 may be attached by a different mechanism, such as a cotter pin or a snap mechanism. In the preferred embodiment, solvent bonding cement, such as PVC cement, is applied to the internal threads of cap 21, and to the external threads of bushing 14, before cap 21 is threaded over bushing 14 in order to lock cap 21 in place, and to thereby form a durable, water-tight seal between cap 21 and bushing 14 for preventing water leakage after testing is completed. Thereafter, drywall may be installed to cover up standpipe 9, tee fitting 11, and leak-testing device 10. Forming such water tight seal is important, since water leakage might otherwise foster mold growth behind the plastered wall.

Figure 4:
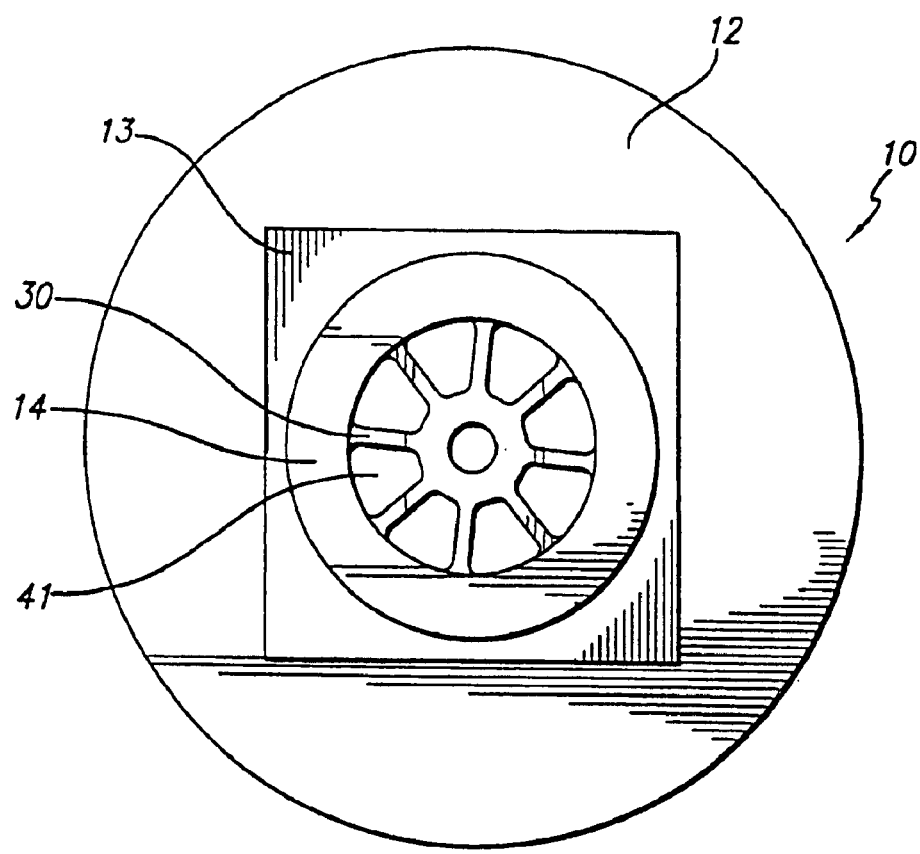
FIG. 4 is a top view of the leak-testing device shown in FIGS. 1–3.

FIG. 4 shows a top view of leak-testing device 10. This view better shows the structure of valve seat 30. In the preferred embodiment, valve seat 30 has eight triangular-shaped peripheral openings 41 spaced about a center opening used to retain valve member 20, but the number and shape of such peripheral openings can vary.

FIG. 5 shows a side view of one-way valve member 20 in the form of an umbrella valve. However, any type of one-way valve may be utilized. One-way valve 20 preferably includes a raised flange 50, which holds the valve in place within the center opening of valve seat 30. Raised flange 50 prevents valve member 20 from disengaging from valve seat 30 and being lost into the pipeline system being tested.

The leak-testing device 10 is preferably made of molded plastic such as ABS or PVC, but may be made of any corrosion-resistant material. For ease of manufacture and to guard against leaks, bushing 14, wrench collar 13 and threaded collar 12 are preferably formed to be integral with each other.

Apart from providing a new and improved leak testing device, it will be appreciated that the applicant has also disclosed an improved method for leak-testing a pipeline system. In practicing such method, the user attaches leak testing device 10 to third opening 15 of tee fitting 11, as by threading base plate 12 into opening 15. The user then attaches female end 31 of the water supply hose to threaded bushing 14 of leak testing device 10, and turns the water supply on to supply water through the one-way valve into standpipe 9 to substantially fill the standpipe. The water supply is then turned off, and the water supply hose is detached from threaded bushing 14. The pipeline system is then tested for leaks. Assuming that no leaks are uncovered, the user permanently leaves leak testing device 10 in place within third opening 15 of tee fitting 11 after leak testing is completed. Leak testing device 10 can be manufactured relatively inexpensively, and leaving it in place does not add significantly to construction costs. Ideally, sealing cap 21 is then engaged over threaded bushing 14, as by engaging the mating threads thereof, to permanently seal threaded bushing 14. As mentioned above, this seal is preferably enhanced by applying plastic cement to such mating threads before engaging the sealing cap over the threaded bushing to form a permanent seal therebetween.

While there has been illustrated and described what is at present considered to be the preferred embodiment of the present invention, it will be understood by those skilled in the art that various changes and modifications may be made, and equivalents may be substituted for elements thereof, without departing from the true scope of the invention. Therefore, it is intended that this invention not be limited to the particular embodiment disclosed as the best mode contemplated for carrying out the invention, but that the invention will include all embodiments falling with the scope of the appended claims.

I claim:

1. A leak-testing device for leak-testing a pipeline system, the pipeline system including a standpipe, the standpipe including a tee fitting, the tee fitting having a tubular section extending between first and second opposing openings axially aligned with each other, the tee fitting including a third opening communicating with the tubular section of the tee fitting and having internal threads, said leak-testing device comprising in combination:

a) a generally circular base plate, said circular base plate having a threaded outer periphery for threadedly engaging the internal threads of the third opening of the tee fitting, said generally circular base plate having a fluid passage extending centrally therethrough;

b) a wrench collar attached to said generally circular base plate and adapted to be engaged by a wrench for tightening said generally circular base plate within the third opening of the tee fitting;

c) a threaded bushing having a fluid passage extending centrally therethrough, the fluid passage of said threaded bushing being axially aligned with, and in fluid communication with, the fluid passage of said generally circular base plate, the fluid passage of said threaded bushing and the fluid passage of said generally circular base plate collectively forming a fluid channel, said threaded bushing being adapted to engage an end of a water supply hose to fill the standpipe with water through said fluid channel;

d) a one-way valve disposed within said fluid channel for admitting water through the fluid channel into the standpipe, while preventing water from escaping through the fluid channel out of the standpipe; and e) said leak-testing device being attachable to the third opening of the tee fitting of the standpipe without extending into, and without obstructing fluid flow within, the tubular section of the tee fitting.

2. The leak-testing device according to claim 1 further comprising a cap to cover and seal said threaded bushing after leak-testing is complete.

3. The leak-testing device according to claim 2 wherein said cap is threaded to threadedly engage the threaded bushing.

4. The leak-testing device according to claim 1 wherein said one-way valve includes a valve seat having at least one aperture therein, and a deformable valve disposed proximate the valve seat.

5. The leak-testing device according to claim 4 wherein said valve seat is located within one of the group of elements consisting of said generally circular base plate, said wrench collar, and said threaded bushing.

6. The leak-testing device according to claim 4 wherein said one-way valve is an umbrella valve that allows fluid to flow in only one direction through the valve seat.

7. The leak testing device according to claim 1 wherein said threaded bushing is externally-threaded to engage a female end of a water supply hose.

8. The leak testing device according claim 1 wherein said threaded bushing is internally-threaded to engage a male end of a water supply hose.

9. A leak-testing device for leak-testing a pipeline system, the pipeline system including a standpipe, the standpipe including a tee fitting, the tee fitting having a tubular section extending between first and second opposing openings axially aligned with each other, the tee fitting including a third opening communicating with the tubular section of the tee fitting and having internal threads, said leak-testing device comprising in combination:

a) a generally circular base plate, said circular base plate having a threaded outer periphery for threadedly engaging the internal threads of the third opening of the tee fitting, said generally circular base plate having a first channel extending centrally therethrough;

b) a wrench collar attached to said generally circular base plate and adapted to be engaged by a wrench for tightening said generally circular base plate within the third opening of the tee fitting, said wrench collar having a second channel extending centrally therethrough;

c) a threaded bushing having a third channel extending centrally therethrough, said threaded bushing being adapted to engage an end of a water supply hose to fill the standpipe with water;

d) said generally circular base plate, said wrench collar, and said threaded bushing being integral with each other, and the first, second, and third channels being aligned about a central axis to collectively form a continuous fluid channel;

e) a one-way valve disposed within said fluid channel for admitting water through the fluid channel into the standpipe, while preventing water from escaping through the fluid channel out of the standpipe; and f) said leak-testing device being attachable to the third opening of the tee fitting of the standpipe without extending into, and without obstructing fluid flow within, the tubular section of the tee fitting.

10. The leak-testing device according to claim 9 further including a threaded cap to threadedly engage the threaded bushing, and to cover and seal said threaded bushing after leak-testing is complete.

11. The leak-testing device according to claim 9 wherein said one-way valve includes a valve seat having at least one aperture therein, and a deformable valve disposed proximate the valve seat, and wherein the valve seat is disposed between said threaded bushing and said wrench collar.

12. The leak-testing device according to claim 9 wherein said one-way valve includes a valve seat having at least one aperture therein, and a deformable valve disposed proximate the valve seat, and wherein the valve seat is disposed between said wrench collar and said generally circular base plate.

13. The leak-testing device according to claim 9 wherein the one-way valve is an umbrella valve.

\* \* \* \* \*